Patented Sept. 15, 1931

1,822,911

UNITED STATES PATENT OFFICE

THOMAS G. STEPHENS, OF LAKEWOOD, OHIO, ASSIGNOR, BY MESNE ASSIGNMENTS, TO KREBS PIGMENT & COLOR CORPORATION, OF WILMINGTON, DELAWARE, A CORPORATION OF DELAWARE

PROCESS OF MAKING LITHOPONES OF HIGH ZINC SULPHIDE CONTENT

No Drawing. Application filed June 20, 1929. Serial No. 372,552.

It has always been considered essential in the preparation of lithopone pigments to co-precipitate the ingredients in order to obtain the desirable properties which could never be duplicated by mere mechanical mixtures of the components.

This is exceedingly simple in the case of ordinary lithopones which contain equimolecular proportions of barium sulfate and zinc sulphide, but the co-precipitation of barium sulfate with more than its equivalent of zinc sulphide becomes more complicated.

My invention refers to a process of making lithopone pigments containing more zinc sulphide than corresponds to equi-molecular proportions, so-called super-lithopones, and comprises reacting with barium polysulphide simultaneously upon zinc sulfate and an insoluble zinc compound and finishing the resulting reaction product by the same well known calcining and treating operations to which single strength crude lithopone precipitates are usually submitted.

When barium polysulphide is added to a slurry of zinc oxide suspended in an aqueous solution of zinc sulfate a precipitate is obtained intimately admixed with the zinc oxide. This precipitate contains barium sulfate and zinc sulphide resulting from the reaction of the Ba and S ions with the zinc sulfate; the polysulphide sulfur also reacts to a certain extent with the zinc oxide depending on the conditions of the temperature, time of contact and concentration; what the exact composition of the precipitated reaction product is, is not fully known. Part of the zinc oxide is already converted to zinc sulphide before the calcining stage, some zinc polysulphide is probably formed and some of the polysulphide sulfur is precipitated as water insoluble, very finely divided sulfur, which is intimately admixed with the other insoluble constituents of the precipitate. This complex precipitate is now separated from the liquid and submitted to a calcining operation. The reaction between the polysulphide sulfur, in whatever form present, and the basic zinc compound goes to completion during the drying and calcining operations with formation of zinc sulphide which remains intimately admixed with the barium sulfate and is evenly distributed throughout the whole product.

It will be seen that in this process there is no co-precipitation of all the zinc sulphide with the barium sulfate and it was found nevertheless that the tinctorial strength of the pigment obtained is superior to lithopones of the same composition prepared by any of the other processes I am aware of. In respect to tinting strength and other properties of the pigment, I also found that the product obtained by my novel process is superior to pigments obtained by calcining mixtures of zinc sulphide, barium sulfate and zinc oxide into which sulfur had been incorporated mechanically or by calcining a co-precipitated mixture of zinc sulphide and barium sulfate to which zinc sulphide prepared separately had been added.

My novel process does not require any molecular relationship between barium and zinc sulfate on the one hand and the polysulphide sulfur and basic zinc compound on the other hand. The amount of zinc sulphide contained in my super-lithopone is governed by the amount of sulfur which is incorporated with barium sulphide to form polysulphide. I am thus enabled to produce super-lithopones of various compositions: 3 barium sulfate and 11 zinc sulphide, or about 60.5% zinc sulphide lithopone corresponds to a polysulphide of the composition $BaS_5$.

Barium polysulphides are easily prepared by dissolving sulfur in barium sulphide solutions, $BaS_5$ being the highest polysulphide which to my knowledge has been prepared. As is common with other polysulphides all possible intermediate compositions are obtainable in solution.

The zinc compounds which can be used to produce the additional zinc sulphide in my process are those water insoluble, or at least difficult soluble compounds which react with sulfur at elevated temperatures to produce zinc sulphide. Basic compounds, such as zinc oxide and zinc hydroxide are some of the above compounds which are eminently suited for the performance of my process, but I also found that insoluble zinc salts of volatile weak acids, such as zinc carbonate, zinc sulfite and the corresponding basic salts can be used to advantage. It was found that the above salts react already in hot aqueous medium with polysulphide sulfur to produce precipitates of a composition similar to that of precipitates obtained with zinc oxide or hydroxide. In the case of the above salts the corresponding acid is liberated during the finishing operations; the polysulphide sulfur reacts also with the compounds during calcination to form sulfur dioxid which escapes as such from the calcining furnace and can be made use of for any desired purpose.

I prefer in general to use an excess of polysulphide sulfur over that actually required to form the excess zinc sulphide. This either escapes as such or combines with the oxygen always present in the calcining equipment to form sulfur dioxide which is in no way detrimental to the furnace charge. The amount of excess to be used depends therefore entirely upon the equipment used.

A great economical advantage inherent to my process resides in the fact that the sulfur needed to produce the excess zinc sulphide is introduced in its cheapest form, that is to say, as elemental sulfur.

For economical reasons also I prefer to use an amount of zinc sulfate which is substantially equivalent to the barium content of the polysulphide; additional amounts of either zinc sulfate or barium polysulphide would remain in solution or react to form soluble compounds, and in each instance there would be a loss of material.

Zinc oxide is best added as such to the zinc sulfate solution before introducing the barium polysulphide. In using other insoluble zinc compounds I can precipitate them directly in the zinc sulfate solution by the addition of the requisite reagents, such as caustic alkali, sodium carbonate or sodium sulfite, leaving unreacted the amount of zinc sulfate needed to react with the barium in the polysulphide. In operating in this manner I will have to carefully wash my lithopone green cake precipitate before calcining, so as to eliminate the soluble sulfates formed. It is therefore sometimes more convenient to prepare the zinc hydroxide, carbonate or sulfite separately, as for instance, from zinc sulfate, wash the precipitate and add it to the zinc sulfate.

The calcined reaction product obtained in my process is finished in any desired manner as is common practice in the lithopone art and as this is well known to those skilled in this art does not need to be described in detail here.

The following examples are given to illustrate my invention in various of its embodiments and as applied to various zinc compounds and compositions of finished super-lithopone, it being understood that my invention is not limited to the exact proportions and conditions given therein. The parts are by weight.

1. 114 parts zinc oxide were slurried up in 1140 parts hot water and the slurry added to 587 parts zinc sulfate solution containing 161.4 parts $ZnSO_4$. A barium polysulphide was made by dissolving 96 parts ground sulfur in 1220 parts barium sulphide solution containing 169.4 parts barium sulphide. The sulfur dissolved at 80° C. when the solution was agitated. The barium polysulphide solution was then slowly added at about 75° C. to the zinc oxide slurry in zinc sulfate kept at the same temperature and well agitated. After the addition agitation was continued for 30 minutes, the precipitate was filtered off and dried at 65° C. It was then calcined in a muffle at about 1550° F., quenched, filtered, washed and finished as usual with other lithopones. The so obtained pigment contained about 50% ZnS; it had an outstanding covering power, normal oil absorption, good color and light resistance. The chemical reactions involved in the preparation of this pigment can be summarized as follows:

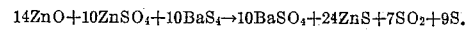

$$14ZnO + 10ZnSO_4 + 10BaS_4 \rightarrow 10BaSO_4 + 24ZnS + 7SO_2 + 9S.$$

A very large excess of sulfur was used in this example due to conditions in the muffle.

2. 822 parts hot zinc sulfate solution containing 226 parts zinc sulfate were run into 600 parts soda ash solution containing 148.5 parts sodium carbonate. The reaction mass was stirred and kept at about 85° C. Carbon dioxid came off in large volume and the precipitate obtained was a basic zinc carbonate of which about 40% was in the carbonate form. The precipitate was washed with hot water 5 times by decantation. 587 parts zinc sulfate solution containing 161.4 parts $ZnSO_4$ were then added to the above basic zinc carbonate slurry. A barium polysulphide solution containing 265.4 parts $BaS_4$ was then slowly run into the above mixture while agitating it and keeping the temperature at about 75° C. The precipitate was then filtered off, and calcined in a stationary muffle at about 1450° F. Large amounts of sulfur dioxide were evolved in the muffling operation. The calcined lithopone was quenched, dried, washed and finished as usual in lithopone manufacture. The so obtained super-lithopone contains about 50% zinc sulphide, it contains only 0.07% zinc oxid and has excellent and very high covering power with normal oil absorption, good color and light resistance.

While the above two examples describe the production of 50% zinc sulphide lithopone, products with other zinc sulphide content are produced in an entirely analogous manner.

The reactions involved in the preparation of such other super-lithopones can be summarized according to the following formulæ:

For a 45.5% zinc sulphide super-lithopone:

$$2ZnO + 2ZnSO_4 + 2BaS_{2.5} = 2BaSO_4 + 4ZnS + SO_2$$

$$2ZnCO_3 + 2ZnSO_4 + 2BaS_{2.5} = 2BaSO_4 + 4ZnS + SO_2 + 2CO_2$$

For a 60.5% zinc sulphide lithopone:

$$8Zn(OH)_2 + 3ZnSO_4 + 3BaS_5 = 3BaSO_4 + 11ZnS + 4SO_2 + 8H_2O.$$

I claim:

1. In a process of preparing super-lithopones the steps comprising reacting with a barium polysulphide upon an aqueous zinc sulfate solution containing in suspension an insoluble zinc compound which reacts at elevated temperatures with sulfur to form zinc sulphide, separating the precipitate formed from the reaction liquor and calcining said precipitate.

2. In a process of preparing super-lithopones the steps comprising reacting with a barium polysulphide upon an aqueous zinc sulfate solution containing in suspension an insoluble zinc compound which reacts at elevated temperatures with sulfur to form zinc sulphide, the amount of zinc sulfate being substantially equivalent to the barium content of the polysulphide, separating the precipitate formed from the reaction liquor and calcining said precipitate.

3. In a process of preparing super-lithopones the steps comprising reacting with a barium polysulphide upon an aqueous zinc sulfate solution containing in suspension an insoluble zinc compound which reacts at elevated temperatures with sulfur to form zinc sulphide, the amount of zinc sulfate being substantially equivalent to the barium content of the polysulphide and the amount of polysulphide sulfur being at least equivalent to the zinc content of said insoluble zinc compound, separating the precipitate formed from the reaction liquor and calcining said precipitate.

4. In a process of preparing super-lithopones the steps comprising reacting with a barium polysulphide upon an aqueous zinc sulfate solution containing in suspension a basic zinc compound, the amount of sulfate radical present being substantially equivalent to the barium content of the polysulphide and the polysulphide sulfur at least equivalent to the zinc in said basic zinc compound, separating the precipitate formed from the reaction liquor and calcining said precipitate.

5. In a process of preparing super-lithopones the steps comprising reacting with a barium polysulphide upon an aqueous solution of zinc sulfate containing in suspension a basic zinc carbonate, the amount of zinc sulfate being substantially equivalent to the barium content of the polysulphide and the amount of polysulphide sulfur being at least equivalent to the zinc content of said basic zinc carbonate, separating the precipitate formed from the reaction liquor and calcining said precipitate.

6. In a process of preparing a super-lithopone the steps comprising reacting with a barium-polysulphide upon an aqueous solution of zinc sulfate containing in suspension an insoluble basic zinc compound, separating the precipitate formed from the reaction liquor and calcining said precipitate.

7. In a process of preparing a super-lithopone the steps comprising reacting with a barium-polysulphide upon an aqueous solution of zinc sulfate containing in suspension an insoluble zinc salt of a volatile acid, separating the precipitate formed from the reaction liquor and calcining said precipitate.

In testimony whereof, I affix my signature.

THOMAS G. STEPHENS.